July 14, 1970
R. E. KAPTUR
3,520,322
FLUID PRESSURE CONTROL SYSTEM
Original Filed Aug. 30, 1965
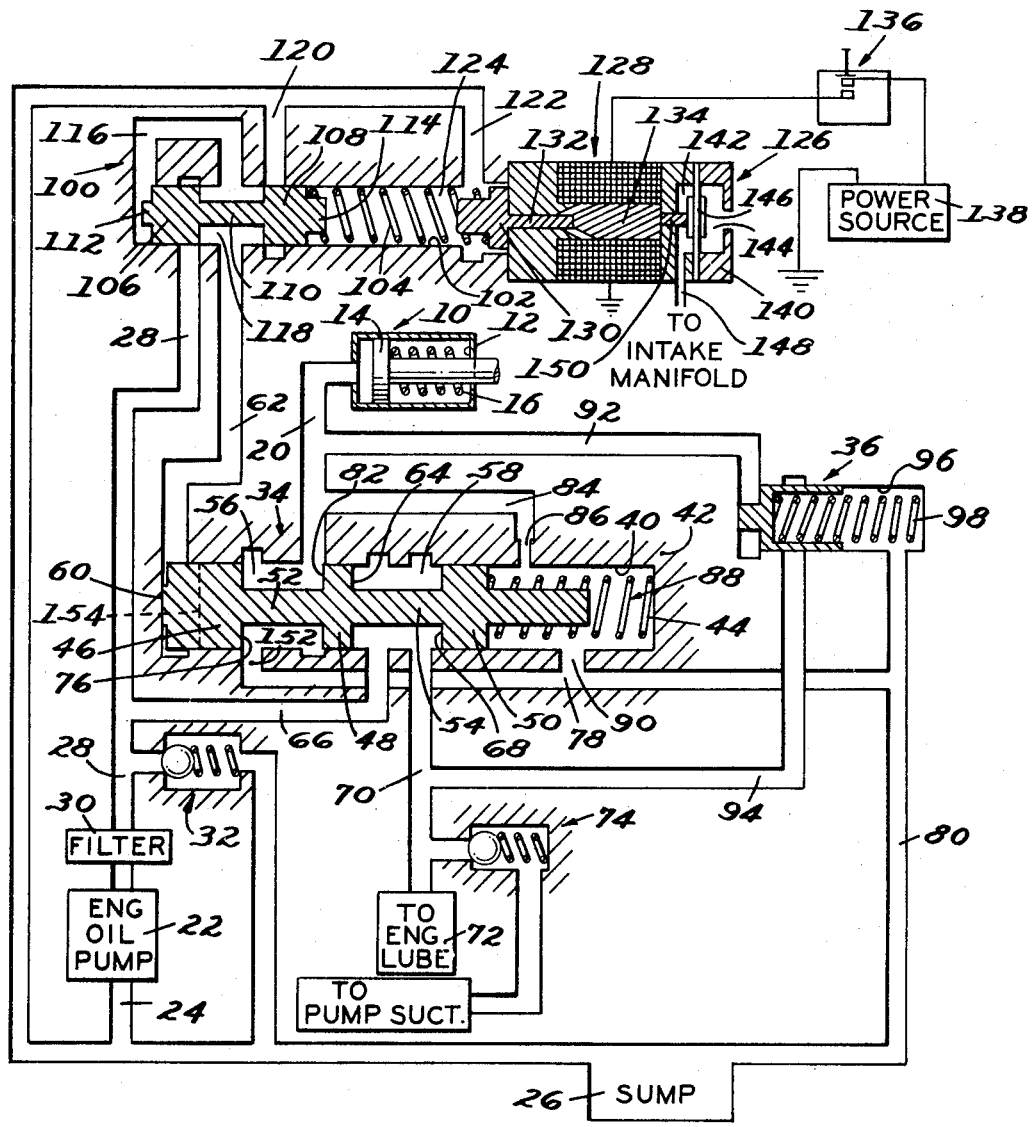
ROBERT E. KAPTUR
INVENTOR.
BY John R. Faulkner
Robert E. McCollum
ATTORNEYS United States Patent Office 3,520,322
Patented July 14, 1970

3,520,322
FLUID PRESSURE CONTROL SYSTEM
Robert E. Kaptur, Birmingham, Mich., assignor to Ford Motor Company, Dearborn, Mich., a corporation of Delaware
Original application Aug. 30, 1965, Ser. No. 483,754, now Patent No. 3,439,584. Divided and this application Jan. 24, 1968, Ser. No. 718,963
Int. Cl. F15b 11/08
U.S. Cl. 137—116.3                                    4 Claims

ABSTRACT OF THE DISCLOSURE

A fluid pressure regulating valve that is movable to any one of three main regulating portions, is variably and progressively movable between two of the positions in response to changes in a source of varying vacuum, such as is provided by an internal combustion engine intake manifold, for example; and, is movable by a selective operable mechanism to the third regulating position to produce an output regulating pressure level that is different than the others.

---

This is a division of Ser. No. 483,754, now Pat. No. 3,439,584, Fluid Pressure Control System, Filed Aug. 30, 1965.

The invention relates to a fluid pressure control system. More particularly, it relates to a fluid pressure system to control the rate of movement of the piston of a servo mechanism. It is preferably for use to control the rate of engagement of a mechanical driveline clutch, of the type shown and described fully in U.S. 3,322,248, Clutch Control, by Robert E. Kaptur et al., assigned to the assignee of this invention, between a motor vehicle internal combustion engine and a manually actuated transmission as a function of engine operating conditions. It will become clear, however, that it will have use in many other installations wherever the control of a fluid supply and a controlled rate of movement of a servo piston is desired.

One of the primary objects of the invention, therefore, is to provide a fluid pressure control systems that regulates the rate of movement of a servo piston as a function of the operating conditions of the mechanism, such as an engine, with which the servo operated device is associated. For example, if a gear ratio change is made in a transmission while the engine is under load, the driveline clutch should be quickly re-engaged to prevent engine run-away; the invention accomplishes this by conditioning the clutch servo piston for a fast return movement with the engine under load. Conversely, if the engine is operating at low or no load conditions, the clutch should be re-engaged slowly to provide smooth operation; the invention also automatically accomplishes this operation.

In the application referred to above, when a gear ratio change is to be made, the vehicle operator depresses a gear shift lever mounted push button, which activates a portion of the control system to supply actuating fluid under pressure to the driveline clutch servo to disengage the clutch. If the button is released while the engine is under high load, a servo apply line control valve will automatically cause the servo apply fluid to quickly drain to a sump through an open exhaust line. If the engine is not under load, the control valve will automatically adjust its position so that the apply fluid drains slowly to the sump. The control system is so constructed that the control valve will also automatically and progressively move between these positions to provide the correct rate of re-engagement of the clutch for the particular engine operating conditions.

Another object of the invention is to provide a fluid pressure operated servo control system that is simple in construction, economical to manufacture, and efficient in operation.

A further object of the invention is to provide a fluid pressure operated servo control system that is both automatic and semi-automatic in operation, and controllable by the vehicle driver.

A still further object of the invention is to provide a fluid pressure control system consisting primarily of two main multi-position control valves regulating both the supply and drain of fluid to and from a servo mechanism.

Another object of the invention is to provide a fluid pressure regulating valve that is movable to any one of three main regulating positions; is variably and progressively movable between two of the positions in response to changes in a source of varying vacuum, such as is provided by an internal combustion engine intake manifold, for example; and, is movable by a selectively operable mechanism to the third regulating position to produce an output regulating pressure level that is different than the others.

It is another object of the invention to provide a fluid pressure control system having a main fluid supply control shift valve cooperating with a branch fluid supply valve in such a manner that in one position of the shift valve, fluid under pressure bypasses the branch valve and is supplied directly to a fluid station; and, movement of the shift valve to a second position causes a servo mechanism to be actuated and terminates the flow of fluid to the fluid station until the servo piston has stroked and the resultant pressure rise in the system is sufficient to open the branch valve and again supply the fluid station.

A still further object of the invention is to provide a fluid pressure control system of the type described that contains a multi-position pilot or leader valve and a multi-position combined shift valve and drain valve; the pilot valve having a number of regulating positions controlling the pressure level of fluid acting on the shift valve, and being responsive to changes in vacuum provided by an internal combustion engine intake manifold to vary the pressure level to control the supply of fluid to or drain of fluid from a fluid pressure actuated servo mechanism; the pilot valve also being selectively operable at will to establish a pressure level sufficient to move the shift valve to one position that effects an immediate stroking of the servo piston at a desired rate; the combination shift and fluid exhaust control valve automatically controlling the drain of fluid from the servo upon deactivation of the system by the vehicle operator so that the servo mechanism will move in the opposite direction at a rate that is compatible with engine operating conditions.

Other objects, features and advantages of the invention will become apparent upon reference to the succeeding, detailed description thereof, and to the drawing schematically illustrating a fluid pressure control system embodying the invention.

As stated previously, the fluid pressure control system illustrated in the figure is preferably for use with the power operated clutch shown and described in U.S. 3,322,248. The specific details of construction and operation of the clutch and associated transmission described therein are believed to be unnecessary for an understanding of the present invention, and, therefore, are not repeated. Suffice it to say that the operation of a motor vehicle driveline mechanical clutch is controlled by a fluid pressure system activated at will by the vehicle driver. The present invention is directed specifically to the fluid pressure control for the clutch servo of that device, although it will be clear that it will have use in many installations other than that shown, in which it is desired to control a servo in the manner to be described.

Referring now to the figure, the fluid pressure control system is used in conjunction with a servo mechanism 10 that may be of a known type. It consists of a cylinder 12 slidably and sealingly receiving a piston 14 therein. The piston is biased towards one end of the cylinder by a spring 16, and is adapted to be moved in the opposite direction by fluid under pressure supplied to a line 20.

The fluid for moving piston 14 is supplied, in this case, by a conventional engine oil pump 22 that is driven at or proportional to the speed of an internal combusiton engine (not shown) to produce an output fluid pressure that changes as a function of the speed. The use of the conventional engine oil pump eliminates the requirement for an additional pump, which reduces the cost of the total assembly, and minimizes maintenance. The pump, therefore, serves two functions; namely, it supplies not only the engine and lubrication requirements, but also the total requirements of the fluid pressure control system for actuating servo piston 14.

The pump may be of a gear or other suitable known type. It has an intake or suction line 24 connected to a fluid sump 26, and discharges fluid through a line 28 past a filter 30. A suitable high pressure relief valve 32 protects the system by returning oil to the intake side of the pump in the event of an unusually high pressure level in line 28.

Control of the flow of oil from pump 22 both to the servo unit 10 and to the engine and lubricating stations is provided by a shift valve 34 cooperating with a check valve 36. Shift valve 34 is slidably mounted in the bore 40 of a valve body 42, and is biased towards one end of the bore by a spring 44. The valve is of the spool type, and has three spaced lands 46, 48 and 50 interconnected by neck portions 52 and 54 of reduced diameter. The neck portions and lands define annular fluid chambers 56 and 58. The valve has a spacer stem 60 at its left end that permits fluid under pressure in a signal line 62 to act on the valve whenever fluid under pressure is in the line.

In the position shown, the shift valve annulus 58 is connected at its left edge portion 64 directly to a branch 66 of pump output line 28. The right edge portion 68 of annulus 58 is connected by a line 70 to the various parts of the internal combustion engine requiring oil and also to the various engine lubricating stations (not shown), indicated in general by block 72. A suitable low pressure relief valve 74 opens at a pressure of, say, 40 p.s.i., to maintain this portion of the system at a relatively low pressure level.

The shift valve annulus 56, at its left-hand edge 76, is connected to an exhaust line 78 that is a branch of a line 80 connected to sump 26. The right-hand edge portion 82 of annulus 56 is connected to the clutch servo apply pressure line 20. This latter line has a first branch line 84 that is connected through a flow restricting orifice 86 to the chamber 88 behind the valve, and therefrom through a branch 90 of line 78 to sump 26. When the shift valve is moved to block the direct connection between lines 20 and 78, the servo must then drain slowly to the sump through line 84 and orifice 86. This provides a slow return rate of movement of servo piston 14 by spring 16.

The servo apply line 20 has a second branch 92 that is connected through the one-way check valve 36 to a branch 94 of engine oil and lubrication line 70, bypassing shift valve 34. Check valve 36 is of a known type slidably movable within a bore 96 of a valve body. It is biased to the left by a spring 98 to block communication between lines 92 and 94 until the fluid pressure level in line 92 reaches a predetermined level of approximately 100 p.s.i., for example.

The purpose of valve 36, as will be described more fully later, is to provide fluid for the engine and lubrication requirements during the time when the shift valve 34 is in a position blocking flow directly from pump line 66 to line 70, but not until after the servo piston 14 has completely stroked, so that quick clutch disengagement at low engine speeds (low pump output) is assured.

The movement of shift valve 34 between to its three main positions is controlled by a fluid pressure regulating pilot or leader valve 100. This latter valve is slidably mounted within a bore 102 in the valve body, and is biased towards the left end of the bore by a spring 104. The valve is of the spool type, and has a pair of spaced lands 106 and 108 interconnected by a neck portion 110 of reduced diameter. Opposite ends of the valve have stem and spring guide portions 112 and 114, respectively. The left end of land 112 is thus subjected at all times to any fluid under pressure that may exist in a line 116 connected to the fluid annulus 118 defined by the valve neck portion 110. The opposite side of annulus 110 is connected to fluid pressure signal line 62. The valve bore 102 is also connected with a pair of drain lines 120 and 122, line 120 draining fluid from annulus 110, while line 122 maintains the spring chamber 124 free of fluid.

Pilot valve 100 is moved to the left to supply fluid under pressure from pump line 28 to fluid annulus 110 and line 116, and simultaneously to the fluid pressure signal line 62.

The valve is moved to one regulating position by spring 104 alone. Assuming that pump 22 is delivering fluid under pressure into line 28, spring 104 biases valve 100 to the left and opens communication between line 28 and signal line 62 and line 116, while closing exhaust line 120. When the pressure builds up in these lines and on the left end portion of land 106 to a value greater than the force of spring 104, the valve will move to the right to begin closing supply line 28 and crack open the drain line 120. Fluid pressure in signal line 62, therefore, begins to decay until it falls below the force of spring 104; at this point, the valve will then progressively move to the left to uncover more of supply line 28 and block more of drain line 120 until an equilibrium position is reached at which point the fluid pressure will balance the force of spring 104. At this time, therefore, the pressure in signal line 62 will be regulated at a predetermined level determined by the force of spring 104.

Pilot valve 100 is moved to other regulating positions to establish other pressure levels in signal line 62 by a vacuum responsive unit 126 and a selectively energized solenoid 128. The pilot valve spring 104 is seated between the end of the valve and a button member 130 formed integral with a stem 132 abutting the armature 134 of solenoid 128. The windings of the solenoid are energized or de-energized at will by a vehicle operator through a push button or other suitably operated switch 136. Depression of the push button closes the contacts of switch 136, which completes a circuit from a suitable power source 138, such as a vehicle battery, to solenoid 128. This immediately causes the armature 134 to move to the left its total permissible distance and apply a force to spring 104. This causes the regulating valve 100 to be moved to the left until the stem 112 of valve land 106 bottoms against the valve body. This results in the pressure in signal line 62 rising to a new level, since it now requires a greater pressure in line 116 to move the valve to a regulating position. Of course, the travel of the armature 134 can be chosen so that the valve will regulate at any desired pressure level up to that of the pressure in line 28.

The vacuum responsive unit 126 automatically and progressively adjusts the position of the regulating valve 100, and, therefore, the regulating pressure level, between the two extreme positions and pressure levels just described. It consists of an open end cylinder 140 fixed to the housing of solenoid 128, and is divided into two chambers 142 and 144 by an annular flexible diaphragm 146. The right-hand face of the diaphragm is subjected to air at atmospheric pressure through the cylinder opening. The left-hand face of the diaphragm and chamber 142 is connected by a tube 148 to a source of varying vacuum, which in this particular case, is preferably the internal combustion engine intake manifold vacuum so as always to be sensitive to changes in engine load and operating conditions. An actuator 150 is secured to diaphragm 146, and abuts the end of armature 134 for transmitting leftward movement of the diaphragm to the armature.

When the engine is operating at part or full load conditions, and the vacuum in line 148 is low or at a minimum, that is, nearly atmospheric pressure, the pressure on opposite sides of diaphragm 146 are substantially balanced. Essentially no force, therefore, is applied by the diaphragm through the armature and button 130 against spring 104. Therefore, if solenoid 128 remains de-energized, regulating valve 100 will be moved to the first regulating position previously described by the force of spring 104 to establish the lowest pressure level in signal line 62. If the vacuum in line 148 rises to a high value, indicating low engine load or torque demand, air at atmospheric pressure acting in chamber 144 on diaphragm 146 will move it and solenoid armature 134 to the left by an amount less than the total permissible movement of the armature but sufficient to increase the force on spring 104 to move valve 100 to establish a higher regulating pressure signal line 62. Of course, the progressive changes in vacuum level will cause progressive movement of valve 100 to progressively vary the pressure level in line 62 between the two extremes of the vacuum level.

In over-all operation, the valves and actuators are shown in the position they attain with the engine running at high load or torque demand conditions, and the vehicle clutch engaged; that is, solenoid 128 is de-energized. Under these conditions, the vacuum in line 148 is low or substantially zero (near atmospheric pressure in chamber 142) and, therefore, the forces on opposite sides of diaphragm 146 are substantially balanced and contribute essentially no force to aid spring 104. With solenoid 128 de-energized, spring 104 provides the only force acting on regulating valve 100 and moves it to the regulating position shown connecting supply line 28 and signal line 62 to provide the lowest pressure level of the fluid in signal line 62.

The force of shift valve spring 44 is chosen such that with the regulating valve positioned as shown, the pressure level of the fluid in signal line 62 acting against the end of shift valve 34 is insufficient to overcome the force of the spring; the shift valve, therefore, remains in the position shown blocking communication between pump line 66 and servo apply line 20 while draining the servo apply line freely through line 78. Simultaneously, fluid from the pump passes through line 66 and around shift valve annulus 58 directly to the engine and lubrication stations 72. The pressure in this line will be limited to 40 p.s.i., however, since this is the point at which relief valve 74 opens.

As stated previously, the oil pump must not only supply the entire requirements of the control system at all engine speeds, but also those for the engine and lubrication purposes. If servo piston 14 is to stroke fast to quickly disengage the vehicle clutch at low engine speeds, therefore, when the pump output is not as great, it is desirable that the supply of oil to line 70 be temporarily cut off so that all of the output of the pump can be used to stroke the servo piston. The shift valve 34 controls this when it shifts to supply fluid to servo line 20 by blocking off the main connection between supply line 66 and the engine and lubrication station line 70, and supplying oil to line 70 through the connecting lines 92 and 94 from the servo apply line 20; this occurs, however, only after the pressure has risen sufficiently to open check valve 36. Thus, the flow of oil to line 70 will be cut off until after the servo piston 14 has stroked and the pressure in line 42 rises to approximately 100 p.s.i.

Assume now that during this high load condition of operation, the operator wishes to make a gear ratio change. He, therefore, closes push button operated switch 136 to complete the circuit from the power source 138 to solenoid 128. This immediately moves armature 134 out of the solenoid a maximum distance to the left to exert the greatest force against spring 104, compressing it. This increased force now moves regulating valve 100 to the left from the position shown to cause it to regulate the fluid in line 62 at the highest pressure level. The line pressure in line 62 therefore, is now substantially equal to the pump pressure in line 28. This high pressure force acting on the left end of shift valve 34 overcomes the force of shift valve spring 44 and moves the valve to the right from the position shown. This connects supply line 66 and servo supply line 20, and blocks engine and lubrication line 70 and branch 152 of drain line 78. Oil under pressure, therefore, quickly strokes servo piston 14 to the right to disengage the vehicle clutch.

As soon as piston 14 has stroked, the pressure of the fluid in servo apply line 20 and acting on check valve 36 increases. When it reaches a value of approximately 100 p.s.i. the check valve will open and again supply fluid or oil to the engine and lubrication stations through lines 94 and 70.

When the gear ratio change has been completed, the operator opens the push button operated switch 136, which deenergizes solenoid 128 and causes it to return to the position shown. Since the low vacuum level in line 148 has remained substantially the same as it was before the gear ratio change was made, the regulating valve 100 will again be moved to its previous regulating position by spring 104 alone and will reduce the pressure in signal line 62 to the lowest pressure level. This permits the shift valve spring 44 to return shift valve 34 to the position shown. Immediately pump supply line 66 is again connected directly to engine and lubrication line 70, and servo apply line 20 drains quickly through branch 152 of sump line 78. Thus, a quick re-engagement of the clutch is provided by a quick return of servo piston 14 to the position shown.

Assume now that a gear ratio change has been completed when the engine is operating at low load indicated by a high vacuum in the intake manifold and in line 148, and that the solenoid 128 has been de-energized so that the clutch servo 10 is ready to exhaust. The position of regulating valve 100 and shift valve 34 both before and after the gear ratio change is made, will be the same. The high vacuum in line 148 permits air at atmospheric pressure acting on the right face of diaphragm 146 to move the diaphragm and solenoid armature 134 leftwardly, and thereby increase the force of spring 104 on valve 100. This causes the regulating valve to move leftwardly to establish a new regulating pressure level that is higher than the high load level, but lower than the level when the declutching operation is desired. This newly established pressure level acting against the end of shift valve 34 is sufficient relative to the force of spring 44 to locate the shift valve at the position indicated by dotted line 154. In this position, the valve blocks off the branch vent line 152 and forces the clutch servo apply line 20 to drain through branch line 84 and orifice 86 into sump line 78. The drain of the clutch servo and rate of return of servo piston 14 to the position shown will now be slow, corresponding to the engine operating conditions, to provide a smooth re-engagement of the clutch when it is to be re-engaged. The other aspects of operation of the system are the same as described in connection with operation under high load conditions.

It will be clear, of course, that while the regulating valve establishes three main predetermined pressure levels in accordance with the highest and lowest vacuum conditions, and energization of solenoid 128, that a progressive change in the pressure level will occur as the vacuum level changes progressively between its minimum and maximum in proportion to the engine operating conditions. Therefore, shift valve 34 will be moved progressively between the dotted line position 154 and full line position indicated, as long as solenoid 128 is de-energized, thereby progressively varying the rate of return of the clutch servo piston 14 to the position shown. The clutch re-engagement rate, therefore, will vary in one respect, as a function of the change in engine intake manifold vacuum as dictated by the progressively changing engine operating conditions.

From the foregoing, therefore, it will be seen that the invention provides a servo control system that automatically varies the rate of servo actuation in one direction in accordance with changing engine operating conditions so that the rate of clutch engagement is always optimized.

What is claimed is:

1. A fluid pressure control, comprising, a source of fluid under pressure, a supply line connected to said source, and flow control means in said supply line for controlling the flow therethrough, said control means including a multi-position fluid regulating valve movable to control the pressure of fluid in said supply line, and means controlling the regulating action of said regulating valve, said latter means including vacuum responsive means moving said regulating valve to regulate the fluid in said supply line at different pressures in response to changes in vacuum, a source of varying vacuum connected to said vacuum responsive means, and selectively operable means connected to said valve when operable moving said regulating valve to a position regulating the pressure of the fluid in said supply line at a pressure level other than the level of said different pressures.

2. A fluid pressure control, comprising, a source of fluid under pressure, a supply line connected to said source, a fluid vent line, and flow control means between said supply and vent lines for controlling the flow therebetween, said control means including a multi-position fluid regulating valve movable between said lines to control the pressure of fluid in said supply line, and means controlling the regulating action of said regulating valve, said latter means including means biasing said valve to one regulating position, vacuum responsive means moving said regulating valve to other regulating positions to regulate the fluid in said supply line at different pressures in response to changes in vacuum, a source of varying vacuum connected to said vacuum responsive means, and operator controlled means connected to said valve when operable moving said regulating valve to a further position regulating the pressure of the fluid in said supply line at a pressure level other than the level produced by the position of the valve in its other regulating positions.

3. A fluid pressure control, comprising, a source of fluid under pressure, a supply line connected to said source, a fluid vent line, and flow control means between said supply and vent lines for controlling the flow therebetween, said control means including a multi-position fluid regulating valve movable between said lines to control the pressure of fluid in said supply line, and means controlling the regulating action of said regulating valve, said latter means including means biasing said valve to one regulating position, vacuum responsive means moving said regulating valve to other regulating positions to regulate the fluid in said supply line at different pressures in response to changes in vacuum, a source of varying vacuum connected to said vacuum responsive means, and operator controlled solenoid means connected to said valve when energized moving said regulating valve to a further position regulating the pressure of the fluid in said supply line at a pressure level other than the level produced by the position of the valve in its other regulating positions.

4. A fluid pressure control, comprising, a source of fluid under pressure, a supply line connected to said source, a fluid vent line, and flow control means between said supply and vent lines for controlling the flow therebetween, said control means including a multi-position fluid regulating valve movable to control the pressure of fluid in said supply line, and means controlling the regulating action of said regulating valve, said latter means including spring means biasing said valve to one regulating position, vacuum responsive means acting on said spring means to increase the force on said regulating valve to move it to regulating positions regulating the fluid in said supply line at different pressures in response to changes in vacuum, a source of varying vacuum connected to said vacuum responsive means, and selectively operable solenoid means operably connected to act on said valve through said spring means when operable effecting a movement of said regulating valve to a position regulating the pressure of the fluid in said supply line at a pressure level other than the level of said different pressures.

References Cited

UNITED STATES PATENTS

| | | | |
|---|---|---|---|
| 2,587,357 | 2/1952 | McPherson | 137—625.24 |
| 2,965,132 | 12/1960 | Couffer et al. | 137—625.64 |
| 3,263,702 | 8/1966 | Pullen et al. | 137—625.64 |
| 3,395,617 | 8/1968 | Kaptur | 137—625.64 XR |
| 3,433,130 | 3/1969 | Freiberger | 91—447 |

M. CARY NELSON, Primary Examiner

R. J. MILLER, Assistant Examiner

U.S. Cl. X.R.

137—625.64